United States Patent
Nakai

(10) Patent No.: US 12,506,216 B2
(45) Date of Patent: Dec. 23, 2025

(54) BATTERY ACCOMMODATION TRAY

(71) Applicant: SANYO Electric Co., Ltd., Osaka (JP)

(72) Inventor: Teruo Nakai, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 524 days.

(21) Appl. No.: 17/926,063

(22) PCT Filed: May 12, 2021

(86) PCT No.: PCT/JP2021/017973
§ 371 (c)(1),
(2) Date: Nov. 17, 2022

(87) PCT Pub. No.: WO2021/241216
PCT Pub. Date: Dec. 2, 2021

(65) Prior Publication Data
US 2023/0187762 A1    Jun. 15, 2023

(30) Foreign Application Priority Data
May 27, 2020   (JP) ................................ 2020-092057

(51) Int. Cl.
*H01M 50/291*     (2021.01)
*H01M 50/213*     (2021.01)
(52) U.S. Cl.
CPC ....... *H01M 50/291* (2021.01); *H01M 50/213* (2021.01); *B65D 2585/88* (2013.01)
(58) Field of Classification Search
CPC .................................................. H01M 50/213
See application file for complete search history.

(56) References Cited

U.S. PATENT DOCUMENTS

2010/0330404 A1   12/2010   Nishino et al.
2011/0076538 A1*   3/2011   Kreiner ................. H01M 50/20
                                                                                429/99
(Continued)

FOREIGN PATENT DOCUMENTS

EP          3460870 A1     3/2019
JP       H10-106520 A      4/1998
(Continued)

OTHER PUBLICATIONS

Machine Translation of abstract of JP-2013196810-A (Year: 2013).*
(Continued)

*Primary Examiner* — Gregg Cantelmo
(74) *Attorney, Agent, or Firm* — WHDA, LLP

(57) ABSTRACT

The purpose of the present disclosure is to provide a battery accommodation tray in which the amount of material used is readily reduced and of which the strength is readily improved. The battery accommodation tray comprises a plurality of accommodation parts that respectively accommodate batteries and that are positioned at intervals from each other. The accommodation parts have insertion openings demarcated by insertion-side circular parts that have a circular shape when viewed from the insertion side of the batteries in the height direction (Z direction). The battery accommodation tray has insertion-side connection parts by which the outer peripheral surfaces of the insertion-side circular parts are connected to the outer peripheral surfaces of adjacent insertion-side circular parts. The plurality of insertion-side circular parts are connected by the plurality of insertion-side connection parts to form an integrated whole.

3 Claims, 15 Drawing Sheets

(56) References Cited

U.S. PATENT DOCUMENTS

| | | | |
|---|---|---|---|
| 2013/0183566 A1* | 7/2013 | Wayne | H01M 10/643 |
| | | | 429/120 |
| 2015/0221914 A1 | 8/2015 | Page et al. | |
| 2016/0322614 A1 | 11/2016 | Kim et al. | |
| 2020/0080793 A1 | 3/2020 | Houle | |
| 2020/0194853 A1 | 6/2020 | Yoo et al. | |

FOREIGN PATENT DOCUMENTS

| | | | | |
|---|---|---|---|---|
| JP | 2003-045390 A | | 2/2003 | |
| JP | 2008-277054 A | | 11/2008 | |
| JP | 2009-193692 A | | 8/2009 | |
| JP | 2013196810 A | * | 9/2013 | |
| JP | 2019-061958 A | | 4/2019 | |
| WO | WO-03103083 A2 | * | 12/2003 | H01M 10/613 |
| WO | 2019/083177 A1 | | 5/2019 | |

OTHER PUBLICATIONS

Office Action dated Jan. 25, 2023, issued in counterpart IN Application No. 202247065991, with English Translation. (5 pages).
Extended Supplementary European Search Report dated Sep. 13, 2024, issued in counterpart Application No. 21814538.1. (8 pages).
Hearing Notice dated Oct. 23, 2024, issued in counterpart Indian Application No. 202247065991. (3 pages).
International Search Report dated Jul. 27, 2021, issued in counterpart International Application No. PCT/JP2021/017973.
Written Opinion of the International Searching Authority dated Jul. 27, 2021, issued in counterpart International Application No. PCT/JP2021/017973.

* cited by examiner

Figure 11(a)
Figure 11(b)
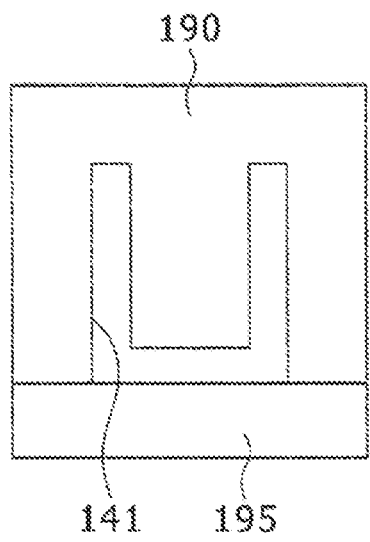
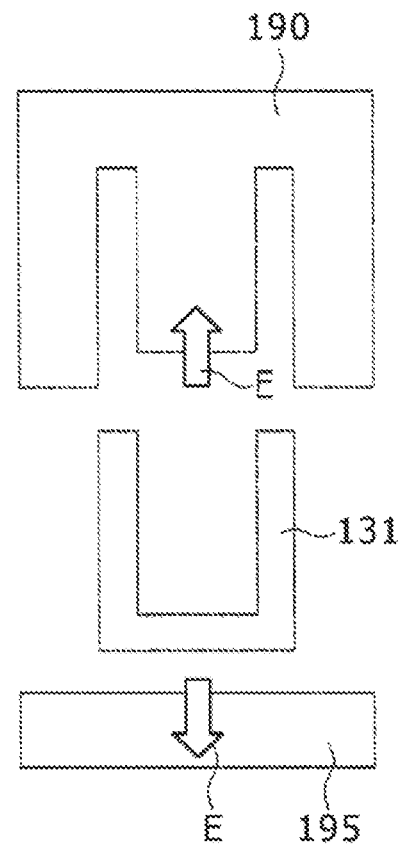

ial Stage of International
BATTERY ACCOMMODATION TRAY

CROSS REFERENCE TO RELATED APPLICATIONS

This Application is the National Stage of International Application No. PCT/JP2021/017973, filed on May 12, 2021, which claims priority from Application No. 2020-092057 filed on May 27, 2020 in Japan. The entire contents of these applications are incorporated herein by reference in their entirety.

TECHNICAL FIELD

The present disclosure relates to a battery housing tray.

BACKGROUND ART

Conventionally, there is a battery housing tray as described in Patent Literature 1. This battery housing tray comprises a plurality of battery housing parts, and each of the battery housing parts has side walls demarcating an insertion opening having a rectangular shape when seen from a battery insertion side in a height direction. In this battery housing tray, each of adjacent two battery housing parts has a shared side wall shared by the two battery housing parts, and the two battery housing parts are partitioned by the shared side walls.

CITATION LIST

Patent Literature

PATENT LITERATURE 1: Japanese Unexamined Patent Application Publication No. 2003-45390

SUMMARY

Technical Problem

As the capacity of a battery increases, the weight of the battery increases. Therefore, it is preferable to enhance the strength of the battery housing tray without significantly increasing the amount of material used.

Hence, an object of the present disclosure is to provide a battery housing tray capable of easily reducing the amount of material used, and easily improving the strength.

Solution to Problem

In order to solve the problem, a battery housing tray according to the present disclosure comprises a plurality of housing parts that each house a battery and are disposed spaced apart from each other, wherein each of the housing parts has an insertion opening demarcated by an insertion-side annular part having an annular shape when seen from an insertion side of the battery in a height direction, the battery housing tray has an insertion-side joining part for joining an outer peripheral surface of the insertion-side annular part to an outer peripheral surface of another insertion-side annular part next to the insertion-side annular part, and a plurality of the insertion-side annular parts are joined and integrated by a plurality of the insertion-side joining parts.

Advantageous Effects of Invention

According to the battery housing tray of the present disclosure, it is easy to reduce the amount of material used, and it is easy to improve the strength.

BRIEF DESCRIPTION OF DRAWINGS

FIGS. 11(*a*) and 11(*b*) are a schematic view for explaining a method of forming the housing part shown in FIG. 10 by injection molding, and also a schematic sectional view, cut along a plane indicated by C in FIG. 10, of first and second molds in the process of forming the housing part.

DESCRIPTION OF EMBODIMENTS

Figure 1:
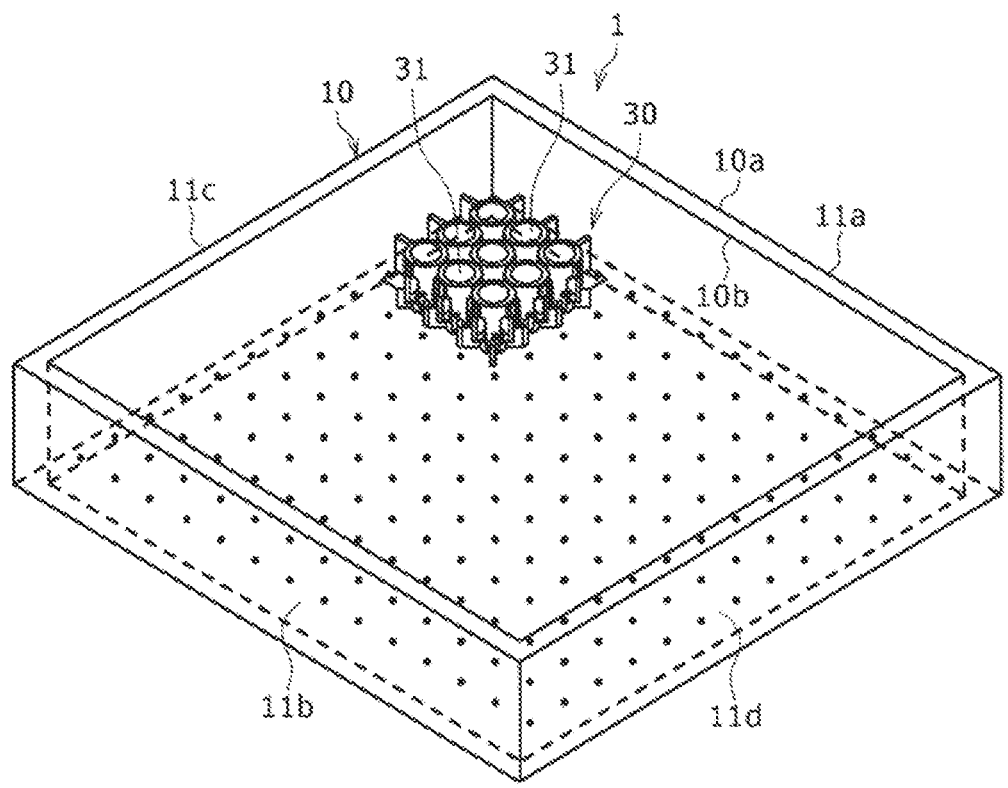
FIG. 1 is a perspective view of a battery housing tray of the present disclosure when seen from diagonally above a battery insertion side in the height direction.

Hereinafter, embodiments of the present disclosure will be described in detail with reference to the attached drawings. It should be noted that, if the following includes a plurality of embodiments and modified examples, it is supposed from the beginning that a new embodiment is created by appropriately combining characteristic parts of these embodiments and modified examples. In the following examples, the same structure is labeled with the same reference sign in the drawings, and repeated description is omitted. Moreover, a plurality of drawings include schematic views, and the ratio of dimensions such as the length, width and height of each member is not always uniform between different drawings. Further, among components explained below, components that are not described in an independent claim stating the highest concept are arbitrary components, and are not essential components. Furthermore, in the present description, the term "substantially" is used in the same meaning as "roughly speaking", and the requirement "substantially . . . " is satisfied if a person sees this as "almost . . . ". For example, the requirement "substantially circular" is satisfied if a person sees this as "almost circular". Additionally, in the following description, for the sake of explanation, the battery insertion side in the height direction may be expressed as the "upper side" or "above" in the height direction, and the battery receiving side in the height direction may be expressed as the "lower side" or "below" in the height direction. In addition, although described in detail below, a battery housing tray 1 has housing parts 31 disposed in a matrix pattern. In the following description, the X direction represents the row direction of the housing parts 31 disposed in the matrix pattern, the Y direction represents the column direction of the housing parts 31 disposed in the matrix pattern, and the Z direction represents the height direction of the battery housing tray 1. The X direction, the Y direction, and the Z direction are orthogonal to each other. It should be noted that the battery housing tray of the present disclosure is preferably used for transport of cylindrical batteries, but may be used for transport of rectangular batteries.

FIG. 1 is a perspective view of the battery housing tray 1 of the present disclosure when seen from diagonally above the battery insertion side in the height direction (diagonally above in the Z direction). It should be noted that, in FIG. 1, in order to facilitate understanding of a side structure of a battery housing structure 30, only a portion of the battery housing structure 30 disposed in a region surrounded by a frame 10 is illustrated, but, in reality, the battery housing structure 30 is disposed without a gap in the region surrounded by the frame 10. The battery housing tray 1 is made of a resin material, or a metal material.

As shown in FIG. 1, the battery housing tray 1 comprises the frame 10 and the battery housing structure 30 as an integrated unit. When seen from the Z direction, the frame 10 has a rectangular outer edge 10a and a rectangular inner edge 10b, the center of the outer edge 10a coincides with the center of the inner edge 10b, and the outer edge 10a is located outside the inner edge 10b. The frame 10 extends in the Z direction. The frame 10 has a pair of first flat plate parts 11a, 11b disposed substantially parallel with a space therebetween in the X direction, and a pair of second flat plate parts 11c, 11d disposed substantially parallel with a space therebetween in the Y direction. Each of the first flat plate parts 11a, 11b extends on a plane including the Y direction and the Z direction, and each of the second flat plate parts 11c, 11d extends on a plane including the X direction and the Z direction. The first flat plate parts 11a, 11b are orthogonal to the second flat plate parts 11c, 11d. Ends of the first flat plate parts 11a, 11b in the Y direction are connected to ends of the second flat plate parts 11c, 11d in the X direction.

The battery housing structure 30 is formed integrally with the frame 10, and, for example, is molded integrally by injection molding. The battery housing structure 30 is disposed in the region surrounded by the frame 10. The battery housing structure 30 has a plurality of identical housing parts 31 disposed spaced apart from each other in a matrix pattern. It should be noted that although the length between rows of the matrix is identical with the length between columns in the example shown in FIG. 1, the length between the rows and the length between the columns of the matrix may not be identical with each other. Alternatively, in the battery housing tray of the present disclosure, the plurality of housing parts may not be disposed in a matrix pattern, and may, for example, be disposed in a staggered pattern.

In each housing part 31, a battery, not shown, is housed. Since the battery housing structure 30 is disposed in the region surrounded by the frame 10, the side periphery of a plurality of batteries housed in the plurality of housing parts 31 is entirely covered with the frame 10. Consequently, since external impact can be received by the frame 10, it is possible to prevent damage to the batteries inside the frame 10 during transportation. Furthermore, if the battery housing structure 30 has the rectangular frame 10 as in the present embodiment, it is easy for a person to grasp the frame 10, and consequently the person can easily transport the battery housing tray 1.

Figure 2:
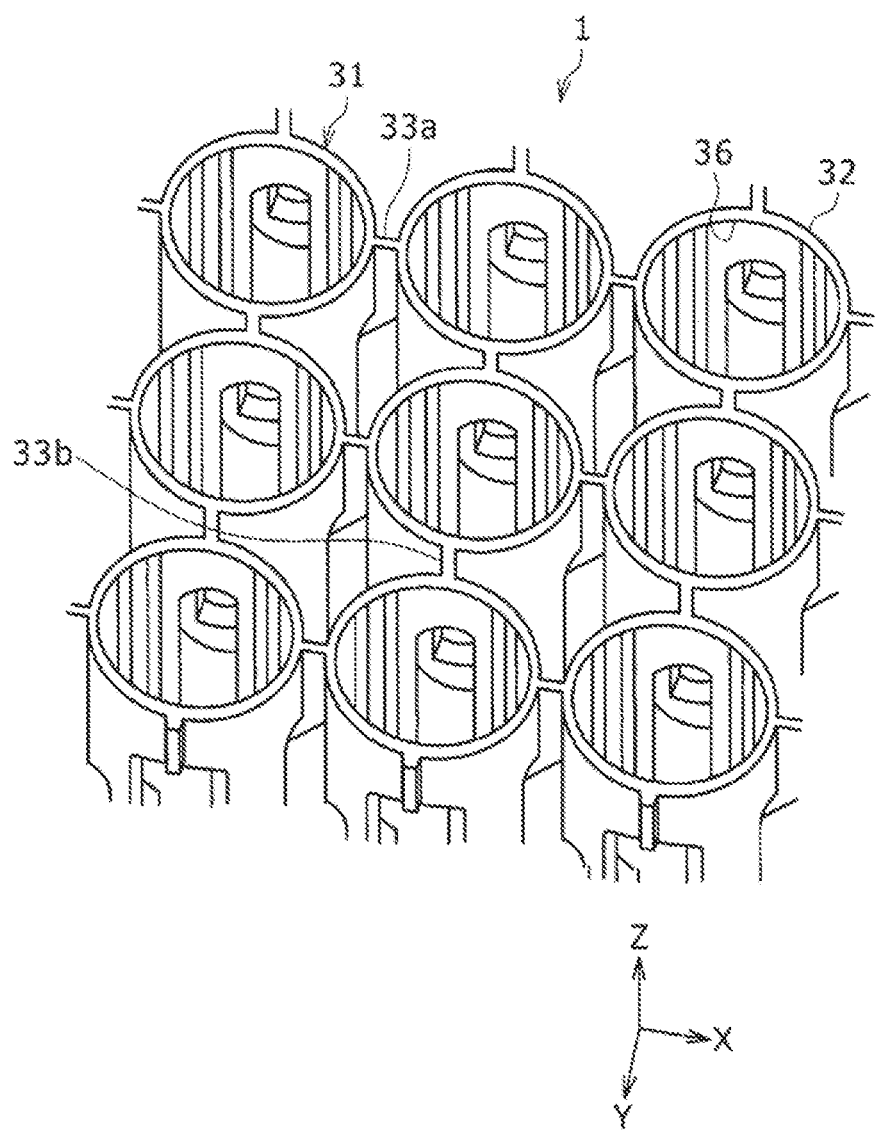
FIG. 2 is a perspective view of a portion of a battery housing structure of the battery housing tray when seen from diagonally above the battery insertion side.

FIG. 2 is a perspective view of a portion of the battery housing structure 30 of the battery housing tray 1 when seen from diagonally above in the Z direction. Additionally, FIG. 3 is a schematic plan view showing an insertion-side grid structure 35 formed by a plurality of insertion-side annular parts 32 and a plurality of insertion-side joining parts 33, when the battery housing tray 1 is seen from the battery insertion side in the height direction (from the upper side in the Z direction).

Figure 3:
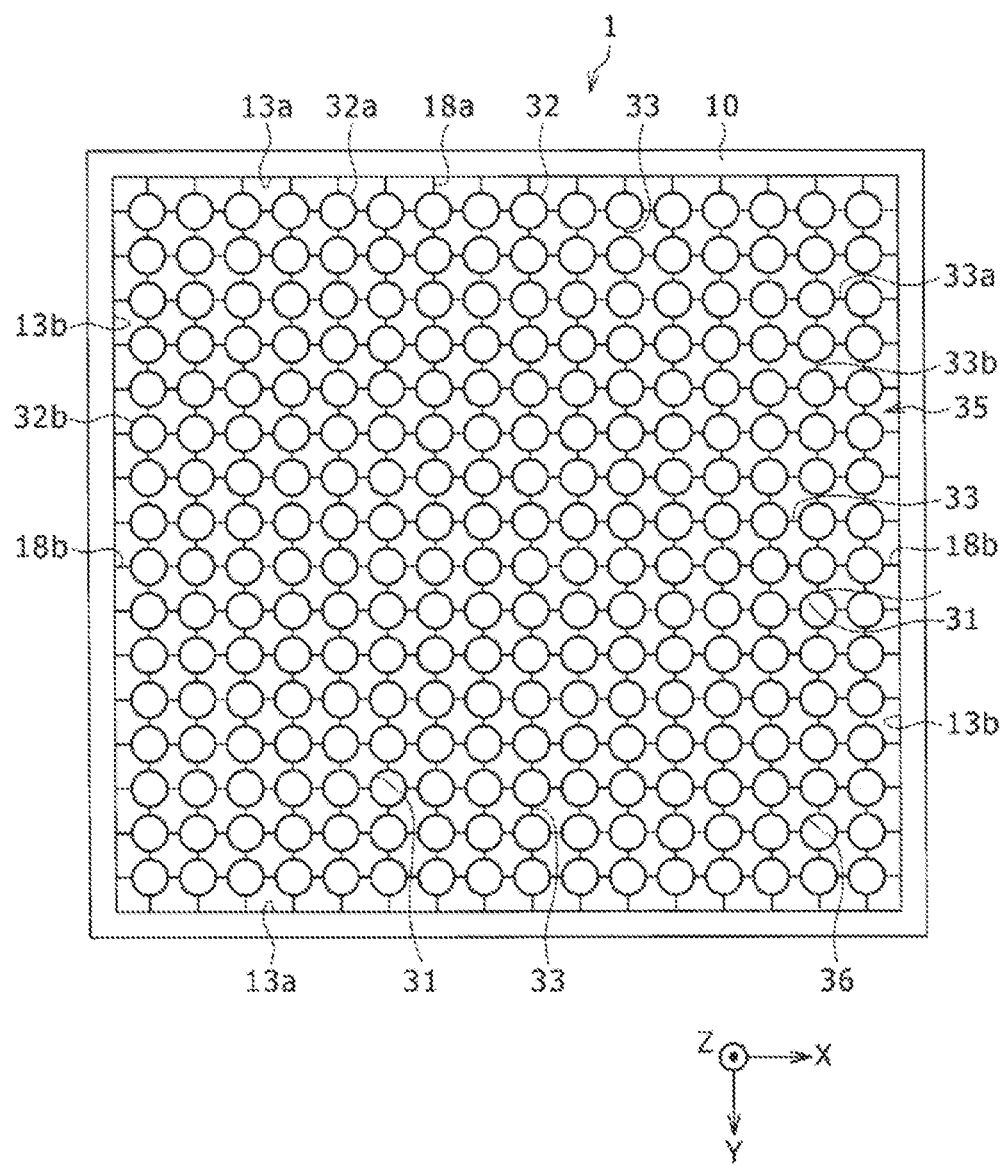
FIG. 3 is a schematic plan view showing an insertion-side grid structure formed by a plurality of insertion-side annular parts and a plurality of insertion-side joining parts when the battery housing tray is seen from the battery insertion side in the height direction.

As shown in FIG. 2 and FIG. 3, each housing part 31 has an insertion opening 36 demarcated by the insertion-side annular part 32 having an annular shape when seen from the battery insertion side in the Z direction. The battery housing structure 30 further comprises the insertion-side joining parts 33 for joining outer peripheral surfaces of the plurality of insertion-side annular parts 32 to outer peripheral surfaces of adjacent insertion-side annular parts 32. The plurality of insertion-side annular parts 32 are joined and integrated by the plurality of insertion-side joining parts 33. The plurality of insertion-side joining parts 33 include a plurality of first insertion-side joining parts 33a extending in the row direction (X direction) of the housing parts 31 disposed in the matrix pattern, and a plurality of second insertion-side joining parts 33b extending in the column direction (Y direction).

As shown in FIG. 3, the plurality of first insertion-side joining parts 33a and the plurality of second insertion-side joining parts 33b are disposed in a grid pattern. When seen from the battery insertion side in the Z direction, each insertion-side joining part 33 is positioned on a line segment connecting the center of the insertion-side annular part 32 and the center of another insertion-side annular part 32 next to the insertion-side annular part 32. More specifically, when seen from the battery insertion side in the Z direction, each first insertion-side joining part 33a is positioned on a line segment connecting the center of the insertion-side annular part 32 and the center of another insertion-side annular part 32 next to the insertion-side annular part 32 in the X direction, and extends in the X direction. Moreover, when seen from the battery insertion side in the Z direction, each second insertion-side joining part 33b is positioned on a line segment connecting the center of the insertion-side annular part 32 and the center of another insertion-side annular part 32 next to the insertion-side annular part 32 in the Y direction, and extends in the Y direction.

As shown in FIG. 3, an outer peripheral surface of each of the insertion-side annular parts 32a of the housing parts 31 disposed along an inner surface 13a extending in the X direction of the frame 10 is joined to the inner surface 13a of the frame 10 by a first insertion-side frame joining part 18a, and connected to the frame 10. The first insertion-side frame joining part 18a extends in the Y direction when seen from the Z direction, and is positioned on a straight line extending in the Y direction from the center of the insertion-side annular part 32a. An outer peripheral surface of each of the insertion-side annular parts 32b of the housing parts 31 disposed along an inner surface 13b extending in the Y direction of the frame 10 is joined to the inner surface 13b of the frame 10 by a second insertion-side frame joining part 18b, and connected to the frame 10. The second insertion-side frame joining part 18b extends in the X direction when seen from the Z direction, and is positioned on a straight line extending in the X direction from the center of the insertion-side annular part 32a. Thus, by connecting the insertion-side grid structure 35 to the frame 10 using the plurality of first insertion-side frame joining parts 18a and the plurality of insertion-side frame joining parts 18b, the strength of the connection structure connecting the insertion-side grid structure 35 to the frame 10 is enhanced.

Figure 4:
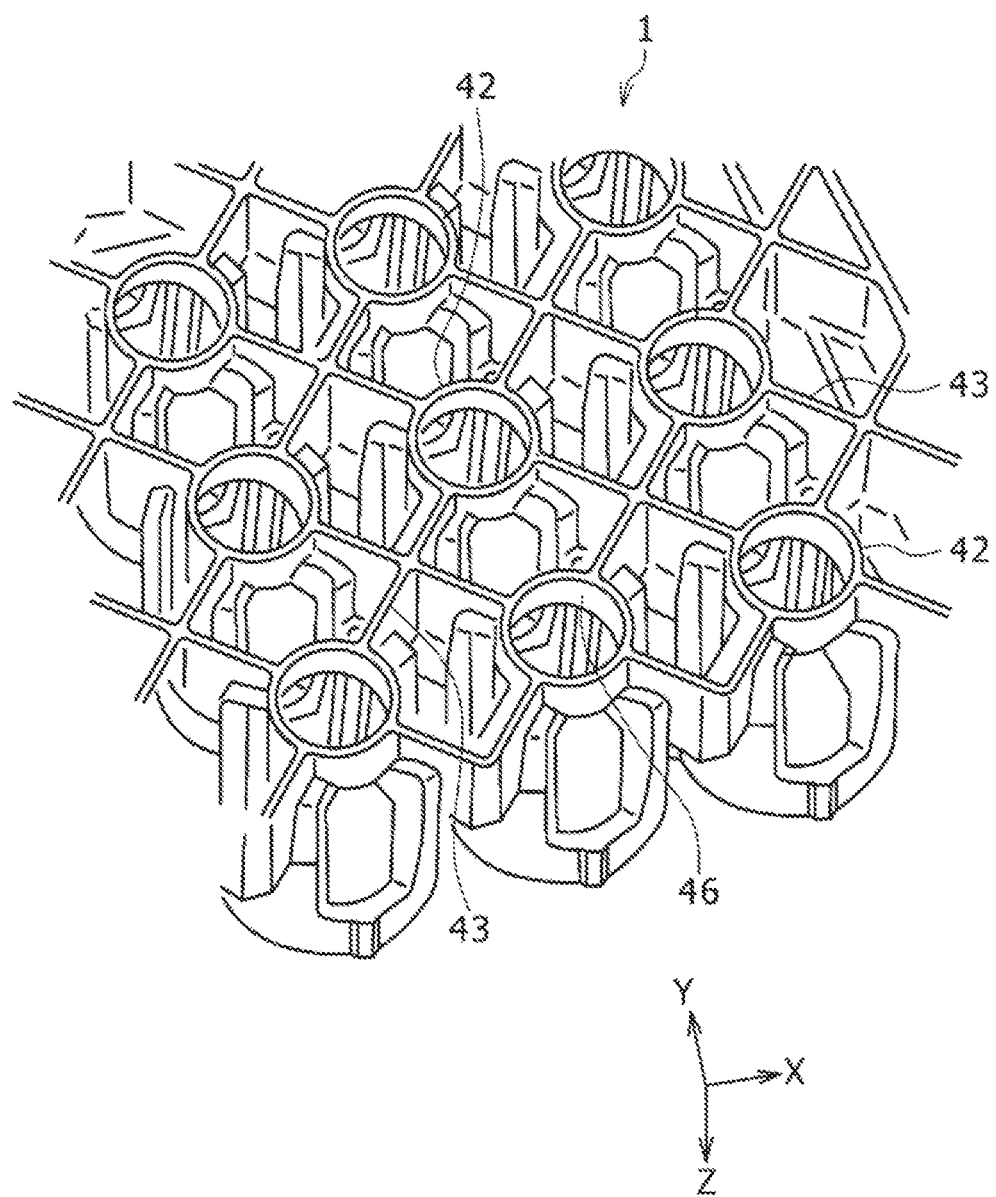
FIG. 4 is a perspective view of a battery receiving side of a portion of the battery housing structure when seen from diagonally below the battery receiving side.

FIG. 4 is a perspective view of a portion of the battery receiving side of the battery housing structure 30 when seen from diagonally below in the Z direction. Further, FIG. 5 is a schematic plan view showing a receiving-side grid structure 45 formed by a plurality of receiving-side annular parts 42 and a plurality of receiving-side joining parts 43, when the battery housing tray 1 is seen from the battery receiving side in the height direction (from the lower side in the Z direction).

Figure 5:
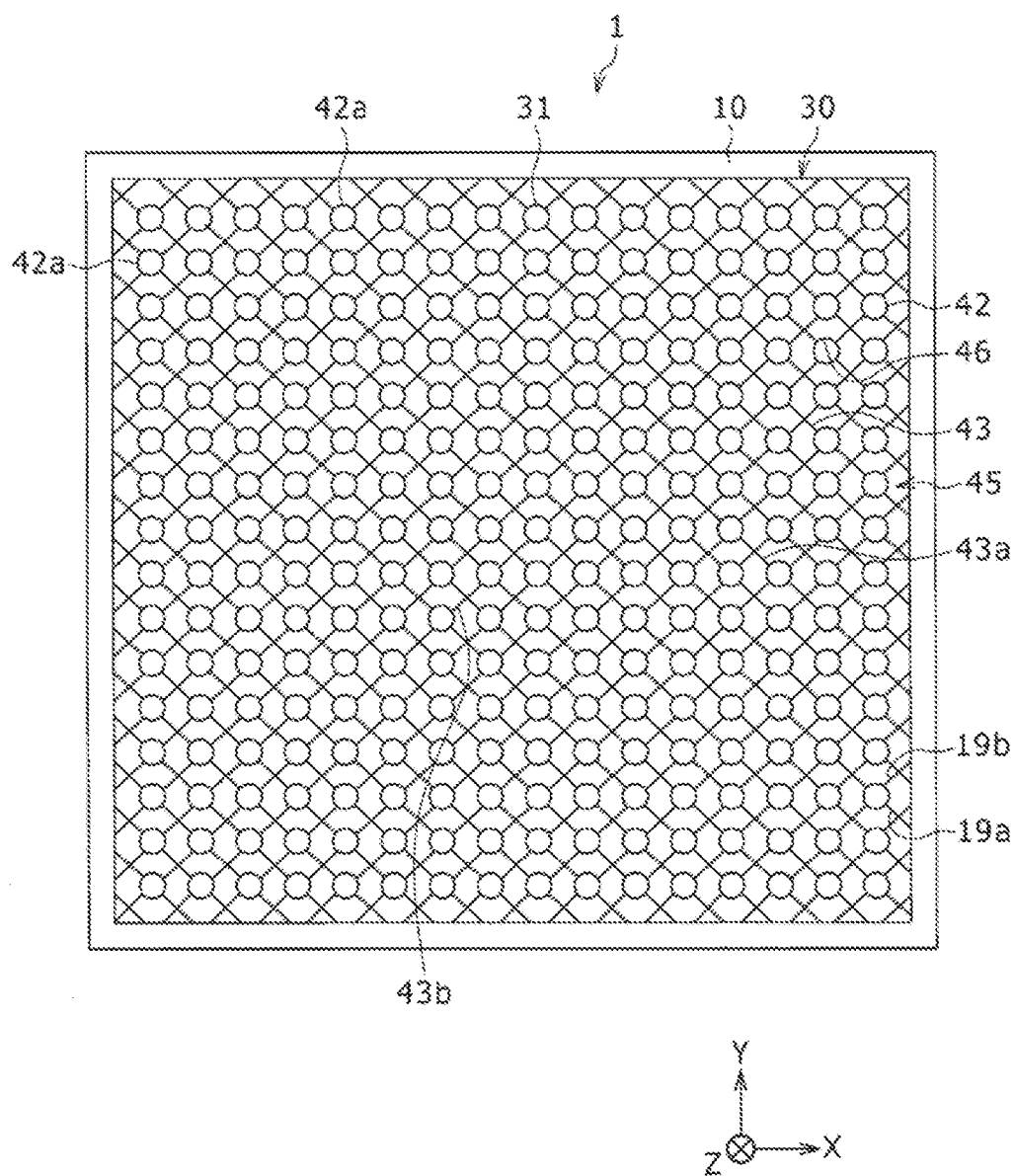
FIG. 5 is a schematic plan view showing a receiving-side grid structure formed by a plurality of receiving-side annular parts and a plurality of receiving-side joining parts, when the battery housing tray is seen from the battery receiving side in the height direction.

As shown in FIG. 4 and FIG. 5, each housing part 31 has the receiving-side annular part 42 having an annular shape on the opposite side to the insertion opening side in the Z direction, and the receiving-side annular part 42 demarcates a substantially circular receiving-side opening 46 having an inner diameter smaller than the diameter of a battery to be housed, and supports the battery to be housed. The battery housing structure 30 further comprises the receiving-side joining parts 43 that join outer peripheral surfaces of the plurality of receiving-side annular parts 42 to outer peripheral surfaces of adjacent receiving-side annular parts 42. The plurality of receiving-side annular parts 42 are joined and integrated by the plurality of receiving-side joining parts 43.

As shown in FIG. 5, each receiving-side annular part 42 is joined to an adjacent receiving-side annular part 42, which is present in a row next to the receiving-side annular part 42 and also present in a column next to the receiving-side annular part 42, by the receiving-side joining part 43. Among the plurality of receiving-side annular parts 42, each of the receiving-side annular parts 42, excluding receiving-side annular parts 42a on the frame side disposed along the inner surface of the frame 10, is joined to four receiving-side annular parts 42 by four receiving-side joining parts 43.

The plurality of receiving-side joining parts 43, if the clockwise direction side when seen from the receiving side in the Z direction (from the lower side in the Z direction) is positive, have a plurality of first receiving-side joining parts 43a extending in a direction inclined at 45° with respect to the X direction, and a plurality of second receiving-side joining parts 43b extending in a direction inclined (at −45°) with respect to the X direction. As a result, the receiving-side joining parts 43 are inclined at an angle of 45° with respect to the insertion-side joining parts 33 (see FIG. 3). Each of the receiving-side joining parts 43 is positioned on a line segment connecting the centers of two receiving-side annular parts 42 joined by the receiving-side joining part 43.

The outer peripheral surface of each of the receiving-side annular parts 42a positioned on the frame 10 side is connected to the inner surface of the frame 10 by a first receiving-side frame joining part 19a and a second receiving-side frame joining part 19b. When seen from the receiving side in the Z direction (from the lower side in the Z direction), the first receiving-side frame joining part 19a extends in a direction inclined at 45° with respect to the X direction, and the second receiving-side frame joining part 19b extends in a direction inclined (at −45°) with respect to the X direction. The extending line of each of the first receiving-side frame joining part 19a and the second receiving-side frame joining part 19b passes through the center of the receiving-side annular part 42a connected to the frame 10 by the first receiving-side frame joining part 19a or the second receiving-side frame joining part 19b. By connecting the receiving-side grid structure 45 to the frame 10 using a plurality of first receiving-side frame joining parts 19a and a plurality of receiving-side frame joining parts 19b, the strength of the connection structure connecting the receiving-side grid structure 45 to the frame 10 is enhanced.

Figure 6:
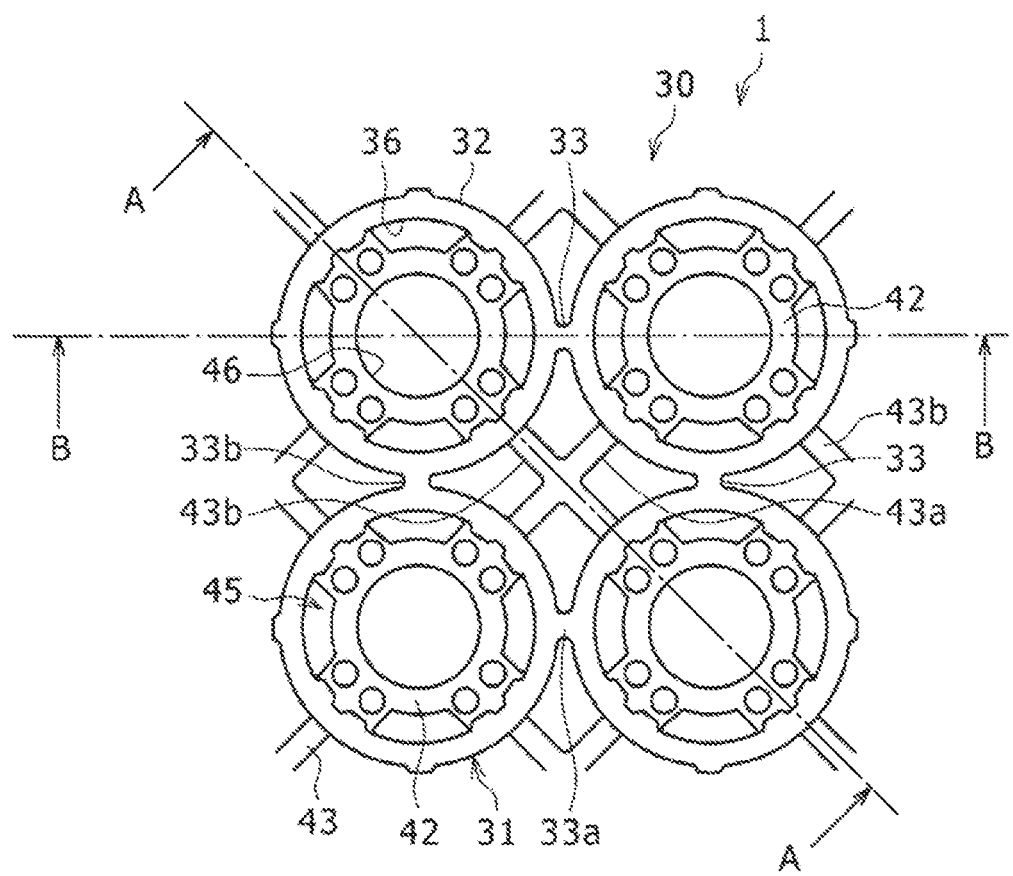
FIG. 6 is a plan view of a portion of the battery housing structure when seen from the battery insertion side in the height direction.
Figure 6:
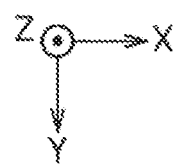

FIG. 6 is a plan view of a portion of the battery housing structure 30 when seen from the battery insertion side in the Z direction. As shown in FIG. 6, in the plan view seen from the Z direction, the center of the insertion-side annular part 32 coincides with the center of the receiving-side annular part 42. Moreover, the area of the insertion opening 36 demarcated by the insertion-side annular part 32 is larger than the area of the receiving-side opening 46 demarcated by the receiving-side annular part 42, and the entire receiving-side opening 46 can be visually recognized in the plan view seen from the height direction. In the present embodiment, in the plan view seen from the Z direction, each of the insertion opening 36 and the receiving-side opening 46 has a substantially circular shape. However, in the plan view seen from the Z direction, the opening demarcated by the receiving-side annular part may not have a substantially circular shape, and may have, for example, a rectangular shape. In the plan view seen from the Z direction, the first receiving-side joining part 43a and the second receiving-side joining part 43b intersect, and are connected to each other, at the center of a region surrounded by four housing parts 31. By connecting the first receiving-side joining parts 43a and the second receiving-side joining parts 43b, the rigidity of the receiving-side grid structure 45 is enhanced.

Figure 7:
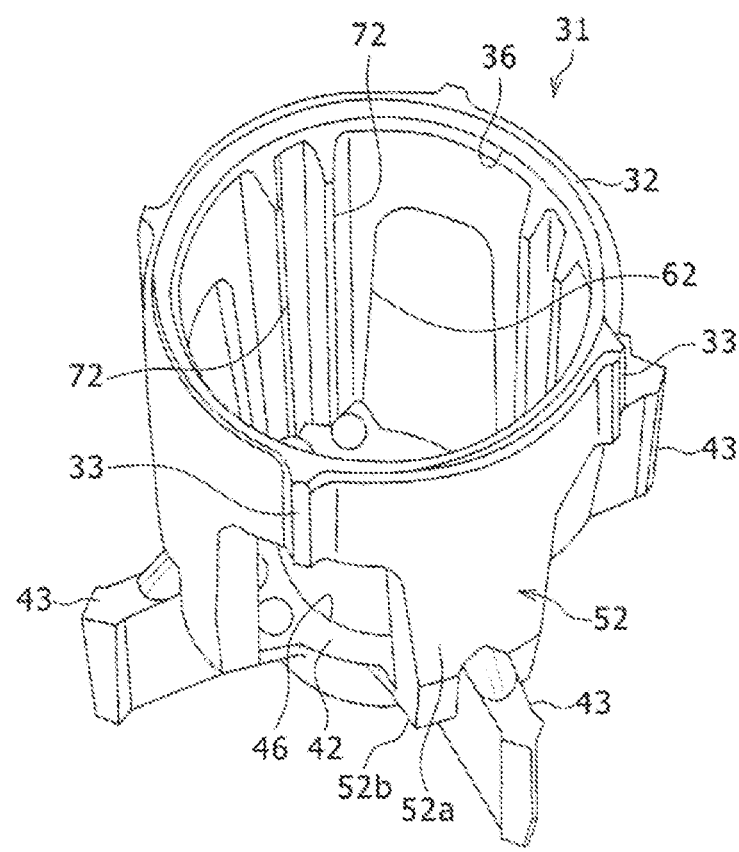
FIG. 7 is a perspective view of one housing part when seen from diagonally above the battery insertion side in the height direction.
Figure 8:
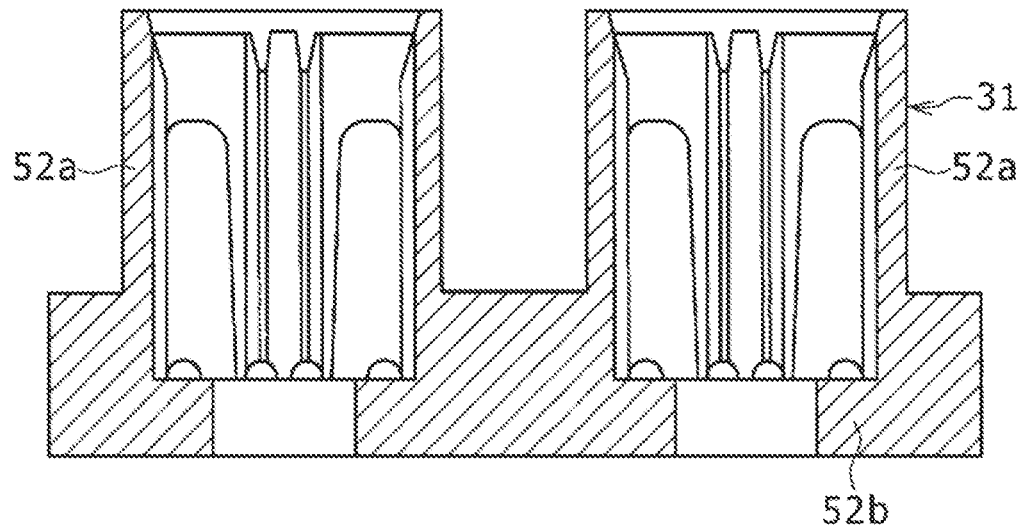
FIG. 8 is a sectional view taken along the A-A line of FIG. 6.
Figure 9:
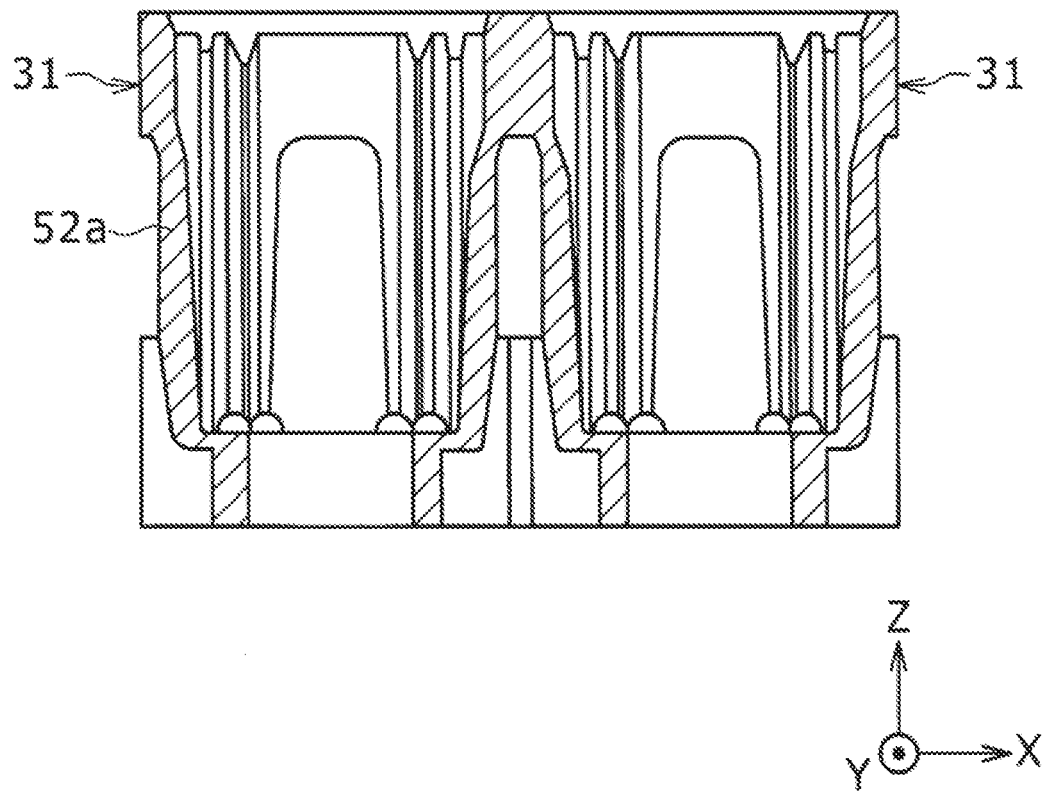
FIG. 9 is a sectional view taken along the B-B line of FIG. 6.

FIG. 7 is a perspective view of one housing part 31 when seen from diagonally above the battery insertion side in the Z direction. Moreover, FIG. 8 is a sectional view taken along the A-A line of FIG. 6, and FIG. 9 is a sectional view taken along the B-B line of FIG. 6. As shown in FIG. 7, the housing part 31 comprises a side wall 52 that extends in the Z direction and joins the insertion-side annular part 32 and the receiving-side annular part 42, and also supports a side surface of a housed battery by covering the side face. The side wall 52 has four notches 62 for communicating an inner space of the housing part 31 with an outer space of the housing part 31. Concerning the circumferential direction of the insertion-side annular part 32, the four notches 62 are positioned between adjacent receiving-side joining parts 43 in the circumferential direction. The notches 62 are open on both sides in the diameter direction of the insertion-side annular part 32, and also open on the lower side in the Z direction.

As shown in FIG. 7 and FIG. 8, the side wall 52 has a height-direction extending part 52a extending from a lower end of the insertion-side annular part 32 toward the lower side in the Z direction, and a radially extending part 52b extending radially inward from an inner surface of a lower end of the height-direction extending part 52a in the Z direction, and connecting to the outer peripheral surface of the receiving-side joining part 43. By providing the radially extending part 52b, it is possible to achieve the structure in which the notches 62 are open on the lower side in the Z direction, and the housing part 31 having the notches 62 can be easily formed by injection molding as described in detail below.

By providing the housing part 31 with the notches 62, it is possible to reduce the amount of material used for molding, and decrease the manufacturing cost. Moreover, since the tray weight can be reduced, it is possible to reduce the burden on transportation. Furthermore, it is possible quickly heat or cool the batteries housed in the battery housing tray 1.

As shown in FIG. 7 and FIG. 9, the inner diameter of the inner surface of the height-direction extending part 52a becomes slightly smaller toward the lower side in the Z direction. In addition, as shown in FIG. 7, the housing part 31 may have, on the inner surface, one or more convex projections 72 that extend in the Z direction from an upper end in the Z direction of the insertion-side annular part 32 to the lower end in the Z direction of the height-direction extending part 52a, and project radially inward. By providing the one or more convex projections 72, it is possible to enhance the rigidity of the housing part 31, and reduce damage to the housing part 31.

Figure 10:
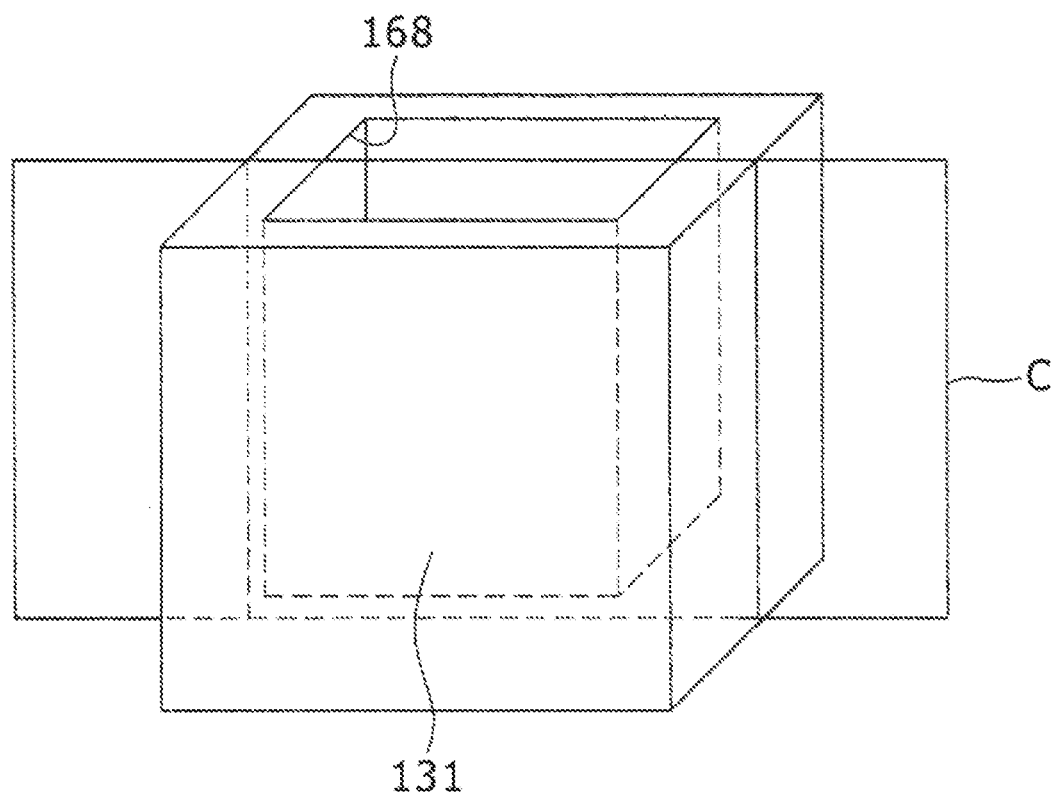
FIG. 10 is a perspective view showing a schematic shape of a housing part having no notch of a modified example.
Figure 12:
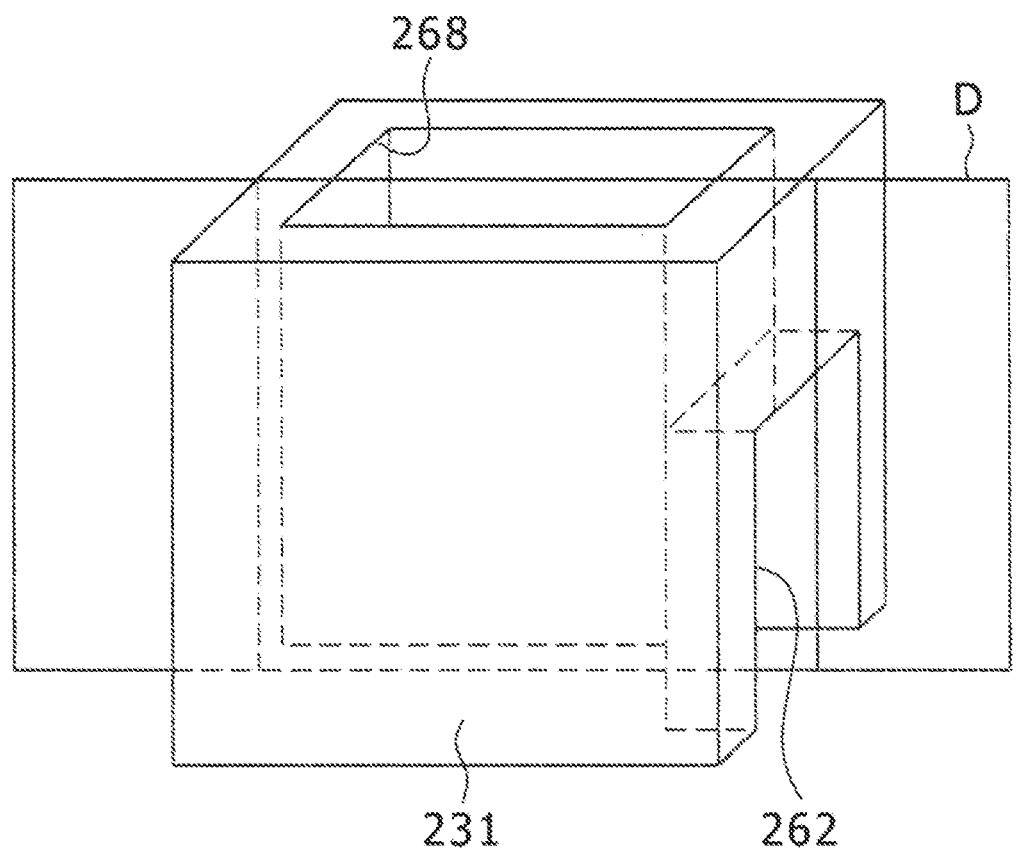
FIG. 12 is a perspective view showing a schematic shape of a housing part including a notch of another modified example.

Next, a method of forming the housing part 31 including the notches 62 by injection molding will be described using FIG. 10 to FIG. 13. FIG. 10 is a perspective view showing a schematic shape of a housing part 131 having no notch of a modified example. FIG. 11 is a schematic view for explaining a method of forming the housing part 131 by injection molding, and is also a schematic sectional view of first and second molds 190, 195 in the process of forming the housing part 131, the sectional view being cut along a plane indicated by C in FIG. 10. Further, FIG. 12 is a perspective view showing a schematic shape of a housing part 231 including a notch 262 of another modified example. Furthermore, FIG. 13 is a schematic view for explaining a method of forming the housing part 231 by injection molding, and is also a schematic sectional view of first and second molds 290, 295 in the process of forming the housing part 231, the sectional view being cut along a plane indicated by D in FIG. 12. It should be noted that although the opening shapes of holes 168, 268 of the housing parts 131, 231 must be substantially circular in reality, the opening shapes of the holes 168, 268 are illustrated as rectangular in the schematic views in FIG. 10 and FIG. 12.

In a case in which the housing part 131 having the hole 168 with a bottom shown in FIG. 11 is formed by injection molding, first, as shown in FIG. 11(a), a recess 141 of the first mold 190, which has the recess 141 having a shape corresponding to the shape of the housing part 131, is closed by the lid-like second mold 195 to make a sealed space, and then a material having fluidity is injected into the sealed space, and hardened. Thereafter, as shown in FIG. 11(b), by separating the first mold 190 and the second mold 195 away from each other in directions indicated by arrow E, the housing part 131 can be removed.

Figure 13A:
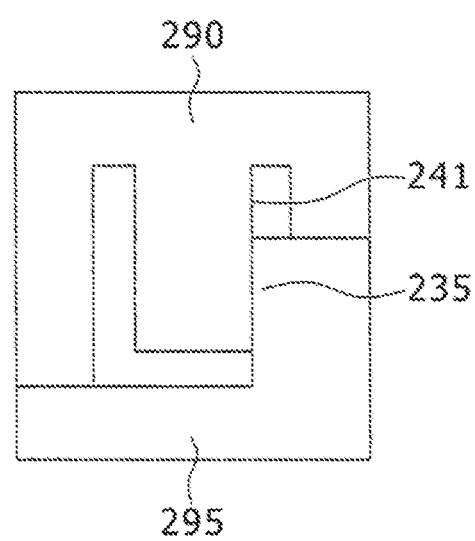
FIGS. 13(*a*) and 13(*b*) are a schematic view for explaining a method of forming the housing part shown in FIG. 12 by injection molding, and also a schematic sectional view, cut along a plane indicated by D in FIG. 12, of first and second molds in the process of forming the housing part.
Figure 13B:
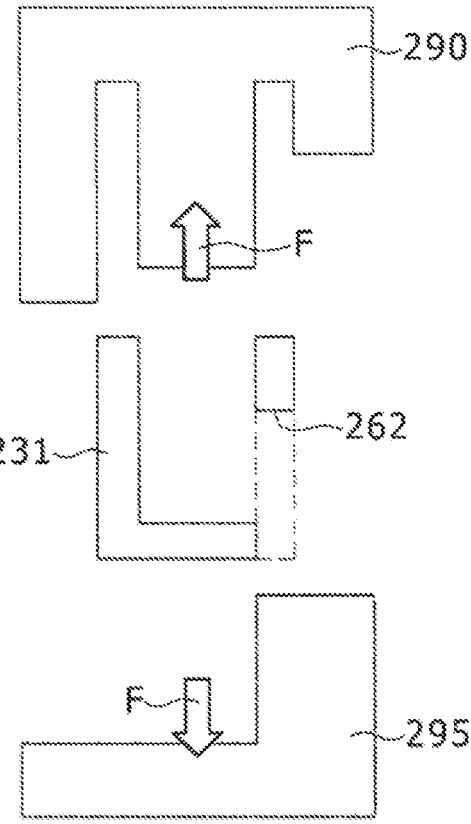

On the other hand, in a case in which the housing part 231 shown in FIG. 12, that is, the housing part 231 having, in addition to the hole 268 with a bottom, the notch 262 on a side wall to communicate with the hole 268, is formed by injection molding, first, as shown in FIG. 13(a), the first mold 290 having a recess 241 in a shape corresponding to a shape of the housing part 231 excluding a portion of the notch 262 is engaged with the second mold 295 that has a projection 235 corresponding to the shape of the notch 262 in a state of being engaged with the first mold 290, and forms a sealed space of a shape corresponding to the shape of the housing part 231 in the state of being engaged with the first mold 290. Then, in this state, a material having fluidity is injected into the sealed space, and hardened. Thereafter, as shown in FIG. 13(b), by separating the first mold 290 and the second mold 295 away from each other in directions indicated by arrow F, the housing part 231 can be removed.

[Battery Housing Tray of Example]

A battery housing tray having the same shape as the battery housing tray 1, and employing a resin material made mainly from polyphenylene ether (PPE) as the material was used as a battery housing tray of an example.

[Battery Housing Tray of Reference Example]

Figure 14:
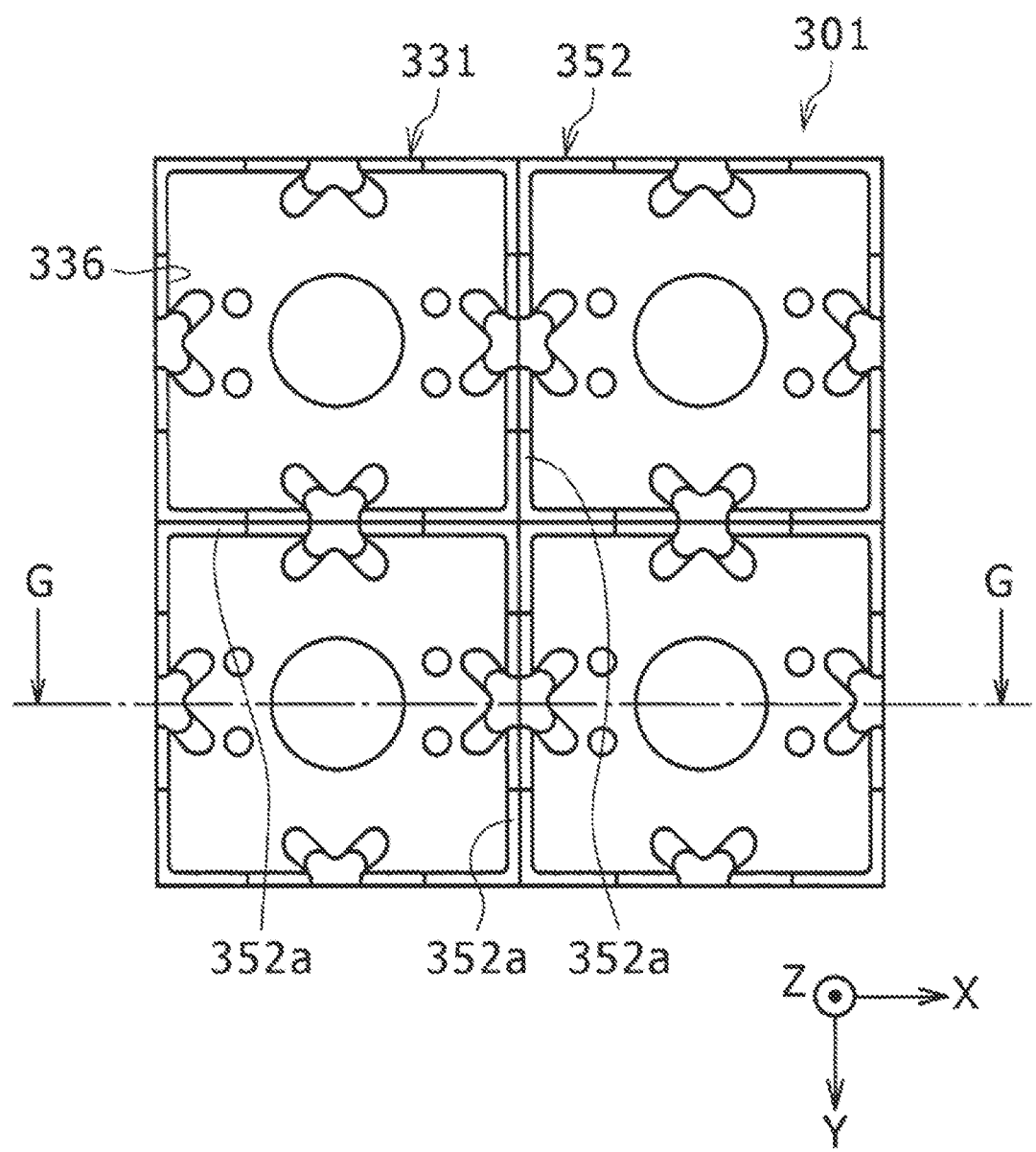
FIG. 14 is a plan view corresponding to FIG. 6 of a battery housing tray of a reference example.
Figure 15:
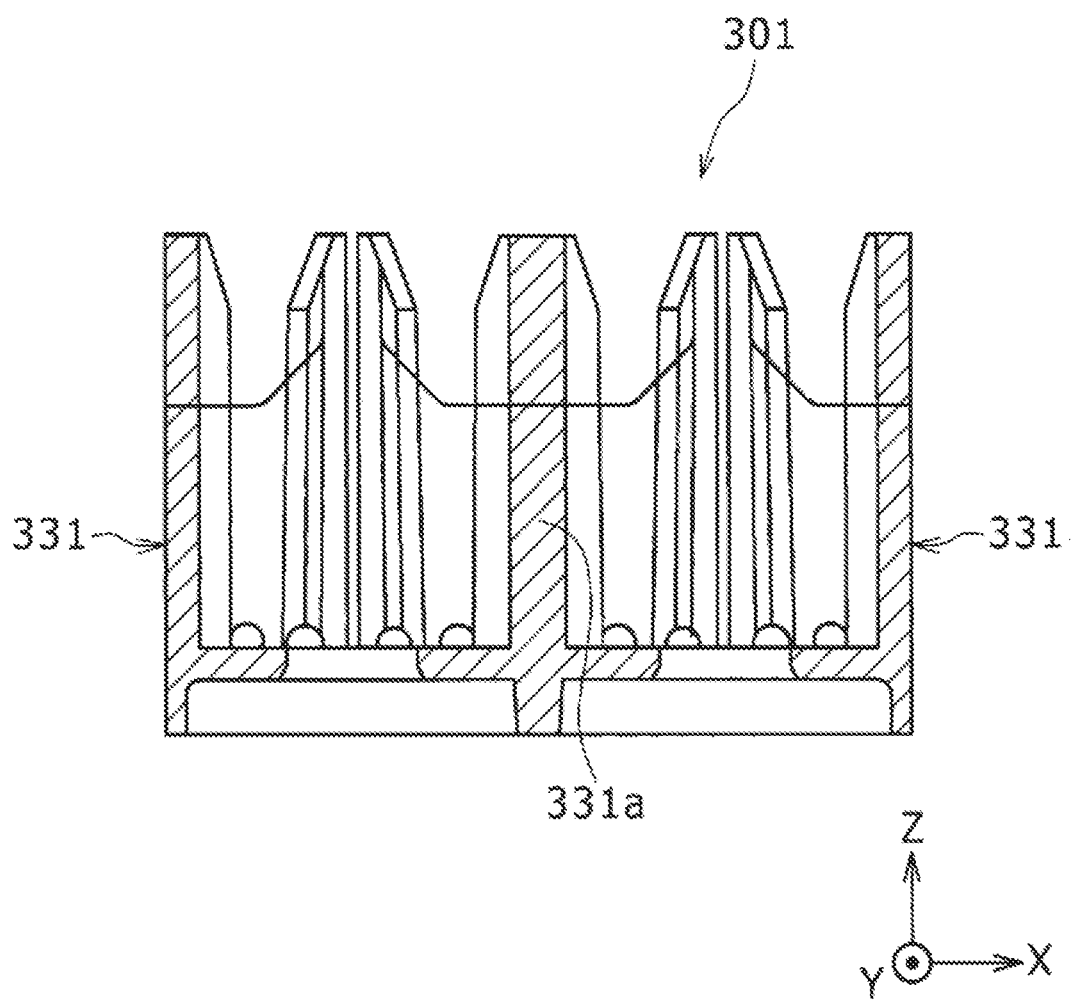
FIG. 15 is a sectional view taken along the G-G line of FIG. 14.

A battery housing tray 301 shown in FIG. 14 and FIG. 15 was employed as a battery housing tray of a reference example. Specifically, in the battery housing tray 301, a battery housing part 331 for housing a battery has side walls 352 demarcating an insertion opening 336 having a substantially rectangular shape when seen from the battery insertion side in the height direction. Moreover, in the battery housing tray 301, each of adjacent two housing parts 331 has a shared side wall 352a shared by the two housing parts 331, and the two battery housing parts 331 are partitioned by the shared side walls 352a. Like the battery housing tray of the example, the battery housing tray 301 was formed by a resin material made mainly from polyphenylene ether (PPE).

[Drop Weight Test]

A drop weight test for confirming presence or absence of destruction of the battery housing tray by dropping a weight of 1.0 Kg onto the battery housing tray from a predetermined height was conducted. The drop weight test was conducted on two samples of each of the reference example, and the example. The test results are shown in Table 1. In Table 1, OK represents absence of destruction, and NG represents presence of destruction.

TABLE 1

| Drop height | Reference example | | Example | |
|---|---|---|---|---|
| (m) | Sample1 | Sample2 | Sample1 | Sample2 |
| 0.1 | OK | OK | OK | OK |
| 0.2 | OK | OK | OK | OK |
| 0.3 | OK | OK | OK | OK |
| 0.4 | NG | NG | OK | OK |
| 0.5 | | | OK | OK |
| 0.6 | | | NG | OK |
| 0.7 | | | | NG |

As shown in Table 1, in the two samples of the battery housing tray of the reference example, the battery insertion side was not destroyed up to 0.3 m. On the other hand, in the two samples of the battery housing tray of the example, the battery insertion side was not destroyed up to 0.5 m. Specifically, while the battery housing tray of the reference example was able to withstand impact of mechanical energy of $1.0 \,[\text{Kg}] \times 9.8 \,[\text{m/s}^2] \times 0.3 \,[\text{m}] = 2.94 \,[\text{J}]$, the battery housing tray of the example was able to withstand impact of about 1.67 times the mechanical energy of the reference example, that is, $1.0 \,[\text{Kg}] \times 9.8 \,[\text{m/s}^2] \times 0.5 \,[\text{m}] = 4.90 \,[\text{J}]$. Thus, it was confirmed that the battery housing tray of the example had remarkably greater strength compared to the battery housing tray of the reference example.

[Configuration of Battery Housing Tray of Present Disclosure, and Function and Effects Thereof]

As described above, the battery housing tray 1 of the present disclosure comprises a plurality of housing parts 31 that each house a battery and are disposed spaced apart from each other. Moreover, each of the housing parts 31 has the insertion opening 36 demarcated by the insertion-side annular part 32 having an annular shape when seen from the battery insertion side in the Z direction. Further, the battery housing tray 1 has the insertion-side joining part 33 for joining the outer peripheral surface of the insertion-side annular part 32 to the outer peripheral surface of another insertion-side annular part 32 next to the insertion-side annular part 32, and the plurality of insertion-side annular parts 32 are joined and integrated by the plurality of insertion-side joining parts 33.

Thus, since the battery housing tray 1 has the same battery insertion-side structure as the battery housing tray of the example above, it is possible to enhance the strength of the battery insertion-side structure (insertion-side grid structure 35) of the battery housing tray, and consequently enhance the strength of the battery housing tray compared to a battery housing tray in which each of housing parts has a rectangular insertion opening in a plan view, and adjacent housing parts are partitioned by the shared side walls.

Furthermore, since the structure of the battery insertion side is a grid structure made by joining and integrating the plurality of insertion-side annular parts 32 by the plurality of insertion-side joining parts 33, it is possible to reduce the weight of the structure of the battery insertion side of the battery housing tray compared to a case in which the spaces between all adjacent insertion-side annular parts 32 are filled with a material.

Consequently, it is possible to realize the battery housing tray 1 capable of easily reducing the amount of material used, and easily improving the strength, and achieve both contradictory features, namely an improvement in the strength of the battery housing tray 1, and a reduction in the amount of material used for the battery housing tray 1.

In addition, since the shape of the insertion opening 36 demarcated by the insertion-side annular part 32 is circular in a plan view, it is possible to prevent a battery from getting caught on the housing part 31 when inserting the battery, and the battery housing tray 1 is less likely to be damaged during insertion of batteries.

[Preferred Battery Housing Tray Configuration to be Employed, and Function and Effects]

The plurality of insertion-side joining parts 33 may be disposed in a grid pattern. Then, when seen from the battery insertion side in the Z direction, each insertion-side joining part 33 may be positioned on a line segment connecting the center of the insertion-side annular part 32 and the center of another insertion-side annular part 32 next to the insertion-side annular part 32.

According to the above configuration, the mass density in an XY plane of the insertion-side grid structure 35 on the battery insertion side of the battery housing tray can be made closer to a uniform value regardless of the position in the XY plane. Therefore, it is possible to reduce the difference in strength between positions in the XY plane of the battery insertion-side configuration of the battery housing tray, and consequently it is possible to further enhance the strength of the battery housing tray 1.

Each housing part 31 may have the receiving-side annular part 42 that has an annular shape and supports a battery, on the opposite side to the insertion opening side in the Z direction. Moreover, each housing part 31 may have the receiving-side joining part 43 for joining the outer peripheral surface of the receiving-side annular part 42 to the outer peripheral surface of another receiving-side annular part 42 next to the receiving-side annular part 42. Further, the plurality of receiving-side annular parts 42 may be joined and integrated by the plurality of receiving-side joining parts 43. Then, the extending direction of the receiving-side joining part 43 may be inclined with respect to the extending direction of the insertion-side joining part 33.

According to the above configuration, since the extending direction of the receiving-side joining part 43 is inclined with respect to the extending direction of the insertion-side joining part 33, a direction in which the structure on the battery insertion side in the Z direction of the battery housing tray 1 can withstand significant impact in the XY plane can be made different from a direction in which the structure on the battery receiving side in the Z direction of the battery housing tray 1 can withstand significant impact in the XY plane. Further, a portion of the insertion-side joining part 33 that does not overlap the receiving-side joining part 43 when seen from the Z direction can be made larger, and, particularly, as in the above-described embodiment, when the extending direction of the insertion-side joining part 33 is inclined at 45° to the extending direction of the receiving-side joining part 43, it is possible to arrange the insertion-side joining part 33 not to overlap the receiving-side joining part 43 at all. Consequently, the battery housing tray 1 can have a strong structure even against impact from the Z direction.

Therefore, the battery housing tray 1 is less likely to be damaged even when the battery housing tray 1 receives impact from any direction, and it is possible to further enhance the strength of the battery housing tray 1, and, particularly, when the extending direction of the insertion-side joining part 33 is inclined at 45° to the extending direction of the receiving-side joining part 43, it is possible to remarkably enhance the strength of the battery housing tray 1. Moreover, since the battery housing tray 1 also has the grid structure on the battery receiving side in the Z direction, it is possible to achieve a reduction in the weight of the battery receiving side in the Z direction of the battery housing tray 1. Consequently, it is possible to further enhance the strength of the battery housing tray 1, and achieve a further reduction in the weight of the battery housing tray 1.

Furthermore, in a case in which the X direction or the Y direction is arranged to coincide with the transport direction of the battery housing tray 1, and the battery housing tray 1 is transported, the receiving-side joining parts 43 are less likely to be caught on a transport roller, and the battery housing tray 1 can be smoothly transported.

In each housing part 31, the side wall 52 covering the side surface of the battery may have the notch 62 for communicating the inner space of the housing part 31 with the outer space of the housing part 31.

According to the above configuration, it is possible to reduce the amount of material used for molding, and decrease the manufacturing cost. Moreover, since the tray weight can be reduced, it is also possible to reduce the burden on transportation. Furthermore, it is possible to quickly heat or cool the batteries housed in the battery housing tray 1.

It should be noted that the present disclosure is not limited to the above-described embodiment and modifications thereof, and it is possible to make various modifications and changes within the scope of the matter stated in the claims of the present application, and equivalence thereof.

For example, the above embodiment explains the case in which the extending direction of the insertion-side joining part 33 is inclined at 45° to the extending direction of the receiving-side joining part 43, and the insertion-side joining part 33 does not overlap the receiving-side joining part 43 at all when seen from the Z direction. However, the battery housing tray of the present disclosure may have a structure in which the extending direction of the insertion-side joining part is inclined at an angle other than 45° to the extending direction of the receiving-side joining part, and the insertion-side joining part does not overlap the receiving-side joining part at all when seen from the Z direction.

Alternatively, a plurality of insertion-side joining parts may have a structure including an insertion-side joining part extending substantially parallel to the extending direction of at least one receiving-side joining part. Alternatively, a plurality of insertion-side joining parts may have a structure including an insertion-side joining part overlapping any one of the receiving-side joining parts when seen from the Z direction. Alternatively, instead of the grid structure on the receiving side of the housing part, a battery receiving portion of the housing part may have a bottom plate.

The case in which there is no joining part joining two different insertion-side joining parts 33 has been described. However, one or more reinforcement joining parts for joining two different insertion-side joining parts 33 may be present.

The case in which a plurality of housing parts 31 are disposed in a matrix pattern with equal line spacing and column spacing when seen from the Z direction has been described. However, as described above, the plurality of housing parts may be disposed in a staggered pattern when seen from the Z direction, and the insertion-side joining parts may be inclined at an angle other than 45° to the receiving-side joining parts, for example, inclined at an angle of about 30°. Moreover, the case in which each housing part 31 has the notch 62 on a side has been described, but the housing part may not have the notch on a side.

REFERENCE SIGNS LIST

1 buttery housing tray; 10 frame; 30 battery housing structure; 31, 231 housing part; 32, 32a, 32b insertion-side annular part; 33 insertion-side joining part; 33a first insertion-side joining part; 33b second insertion-side joining part; 35 insertion-side grid structure; 36 insertion opening; 42, 42a, 42b receiving-side annular part; 43 receiving-side joining part; 43a first receiving-side joining part; 43b second receiving-side joining part; 45 receiving-side grid structure; 46 receiving-side opening; 52 side wall; 52a height-direction extending part, 52b radially extending part; 62, 262 notch, 72 convex projection; 131 housing part; 190, 290 first mold; and 195, 295 second mold.

The invention claimed is:

1. A battery housing tray comprising a battery housing structure, wherein the battery housing structure comprises:
   a plurality of housing parts that each house a battery and are disposed spaced apart from each other, each of the housing parts including
      an insertion opening demarcated by an insertion-side annular part having an annular shape when seen from an insertion side of the battery in a height direction, and
      a receiving-side annular part that has an annular shape and supports the battery housed in the housing part, on an opposite side to the insertion opening side in the height direction;
   an insertion-side joining part for joining an outer peripheral surface of the insertion-side annular part to an outer peripheral surface of another insertion-side annular part next to the insertion-side annular part; and
   a receiving-side joining part for joining an outer peripheral surface of the receiving-side annular part to an outer peripheral surface of another receiving-side annular part next to the receiving-side annular part,
   wherein
   a plurality of the insertion-side annular parts are joined and integrated by a plurality of the insertion-side joining parts,
   a plurality of the receiving-side annular parts are joined and integrated by a plurality of the receiving-side joining parts, and
   an extending direction of the receiving-side joining part is inclined with respect to an extending direction of the insertion-side joining part.

2. The battery housing tray according to claim 1, wherein the plurality of insertion-side joining parts are disposed in a grid pattern, and
   each of the insertion-side joining parts is positioned on a line segment connecting a center of the insertion-side annular part and a center of another insertion-side annular part next to the insertion-side annular part when seen from the insertion side of the battery in the height direction.

3. The battery housing tray according to claim 1, wherein, in each of the housing parts, a side wall covering a side surface of the battery housed in the housing part has a notch for communicating an inner space of the housing part with an outer space of the housing part.

* * * * *